US008024163B2

(12) United States Patent
Busche et al.

(10) Patent No.: US 8,024,163 B2
(45) Date of Patent: Sep. 20, 2011

(54) METHOD AND APPARATUS FOR EXECUTING MULTIPLE SIMULATIONS ON A SUPERCOMPUTER

(75) Inventors: Frederick D. Busche, Highland Village, TX (US); Kirk A. Boothe, Daphne, AL (US); Shahinaz Nabih Carson, Belmont, MA (US); Alexander Darius Zekulin, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 11/781,890

(22) Filed: Jul. 23, 2007

(65) Prior Publication Data

US 2009/0031308 A1  Jan. 29, 2009

(51) Int. Cl.
*G06G 7/48* (2006.01)
*G06G 7/58* (2006.01)

(52) U.S. Cl. ............................. 703/6; 703/11

(58) Field of Classification Search .................. 703/15, 703/6, 11
See application file for complete search history.

(56) References Cited

U.S. PATENT DOCUMENTS

| 6,321,363 | B1 * | 11/2001 | Huang et al. ................. 716/4 |
| 6,370,493 | B1 * | 4/2002 | Knapp et al. ................. 703/14 |
| 6,915,212 | B2 * | 7/2005 | Kamps ........................... 702/14 |
| 6,950,817 | B1 * | 9/2005 | Bernard ........................... 707/3 |
| 2003/0069991 | A1 * | 4/2003 | Brescia ........................... 709/245 |

OTHER PUBLICATIONS

"LoadLeveler Jobs with Multiple Steps (Chain Jobs)" Chapter 9 [online] Jun. 4, 2006 [retrieved on Sep. 15, 2009] Retrieved from the internet: <URL:http://web.archive.org/web/20060604053627/http://www.hlrn.de/doc/loadl/chainjobs.html>.*

Dawal, Umeshwar. Widom, Jennifer. Hanson, Eric. "Active Database Systems". [online] Sep. 1994 [ retrieved on Sep. 8, 2009] Modern Database Systems:The Object Model, Interoperability, and Beyond, Addison-Wesley Reading.*
Sang-Yule Choi, Myong-Chul Shin, Nam-Young, Hur, Jong-Boo Kim, Tai-hoon Kim, Jae-Sang Cha. "Distribution Data Security System Based on Web Based Active Database." [online] 2005 [retrieved online Sep. 8, 2009.*
Bhanot, Gyan. Chen, Dong. Gara, Alan. Vranas, Pavlos. "The Blue Gene/L Supercomputer" [online] 2003. [Retrieved on Sep. 9, 2009] Retrieved from Science Direct.*
"Migration to a Service Oriented Architecture" [online] 2003 [retrieved on Oct. 7, 2009] URL: <http://www.ibm.com/developerworks/library/ws-migratesoa/>.*
Vasilakis et al. "A Data Warehouse Environment for Storing and Analyzing Simulation Output Data" [online] 2004 [retrieved on Oct. 7, 2009] IEEE Database.*
Coteus et al., Packaging the Blue Gene/L supercomputer, IBM J. Res. & Dev. vol. 49 No. 2/3 Mar./May 2005; pp. 213-248.*
Obama Honors IBM's Blue Gene Supercomputer with National Medal, obtained from http://soaworld2009west.sys-con.com/node/1112228/print, one page, 2009.*

* cited by examiner

*Primary Examiner* — Hugh Jones
(74) *Attorney, Agent, or Firm* — Sawyer Law Group, P.C.

(57) ABSTRACT

A supercomputer processing system is provided that is configured to execute a plurality of simulations through transaction processing. The supercomputer processing system includes a supercomputer configured to execute a first simulation of the plurality of simulations and generate an output based upon execution of the first simulation, and a transaction hub. The transaction hub includes a relational database configured to store the output of the first simulation, and an application server having a service-oriented architecture (SOA) that supports an event triggering service. The event triggering service is configured to detect the output of the first simulation and automatically trigger the supercomputer to execute a second simulation of the plurality of simulations using the output of the first simulation stored in the relational database.

4 Claims, 4 Drawing Sheets

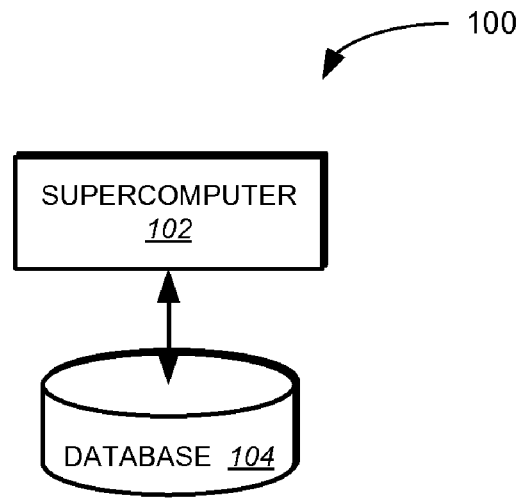
FIG. 1 *(PRIOR ART)*
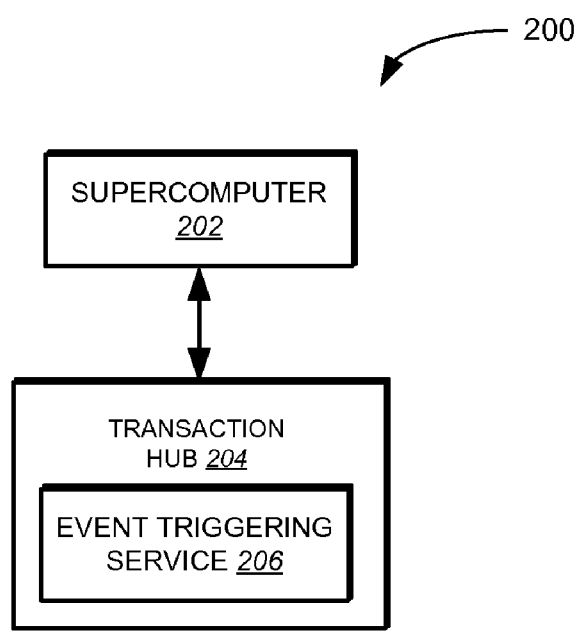
FIG. 2

METHOD AND APPARATUS FOR EXECUTING MULTIPLE SIMULATIONS ON A SUPERCOMPUTER

FIELD OF THE INVENTION

The present invention relates generally to data processing, and more particularly to techniques for executing multiple simulations on a supercomputer.

BACKGROUND OF THE INVENTION

A supercomputer is generally a computer that leads in terms of processing capacity, particularly speed of calculation, at a time of introduction. Supercomputers are typically used for executing highly calculation-intensive tasks such as problems involving quantum mechanical physics, weather forecasting, climate research (including research into global warming), molecular modeling (computing the structures and properties of chemical compounds, biological macromolecules, polymers, and crystals), physical simulations (such as simulation of airplanes in wind tunnels, oil reservoir simulations, simulation of the detonation of nuclear weapons, and research into nuclear fusion), large population behavioral simulations (fashion trends, stock buying behaviors), cryptanalysis, simulated clinical trials for new drug inventions, and the like. Heavy users of supercomputers include major universities, military agencies, oil and pharmaceutical companies, financial organizations, and scientific research laboratories.

Current generation supercomputers typically have a same top-level, parallel architecture that comprises a cluster of nodes (e.g., compute nodes or input/output nodes), which enables the supercomputers to run at speeds over 100 TFLOPS ($10^{12}$ FLOPS (Floating Point Operations Per Second)). Each compute node typically implements a limited memory and a minimal operating system that supports only a single user program, and consequently, supercomputers are generally equipped to only execute simulations in batch mode—i.e., process a group of transactions at one time. Accordingly, processors associated with a supercomputer are designed to utilize data from a database that has been previously staged (e.g., by a user) during execution of a simulation. For example, FIG. 1 illustrates a conventional supercomputer processing system 100 including a supercomputer 102 in communication with a database 104. Upon completion of an execution of a simulation, results of the simulation are fed back into the database 104 to be viewed by the user. Such operation of the super computer processing system 100 works well if a user desires only the results of a single simulation. However, if the user is interested in results of multiple simulations (in which a result of a given simulation builds on a result of a previous simulation), execution of the multiple simulations generally cannot be executed from a single setup—that is, a user is required to stage a database (e.g., database 104) with correct data after each simulation, which can be a time consuming process.

BRIEF SUMMARY OF THE INVENTION

In general, this specification describes a supercomputer processing system that is configured to execute a plurality of simulations through transaction processing. The supercomputer processing system includes a supercomputer configured to execute a first simulation of the plurality of simulations and generate an output based upon execution of the first simulation, and a transaction hub. The transaction hub can include either a relational database configured to store the output of the first simulation or be connected to an analytical relational database where successive simulations can be stored for later analysis. The hub includes an application server which has a service-oriented architecture (SOA) that supports an event triggering service. The event triggering service is configured to detect the output of the first simulation and automatically trigger the supercomputer to execute a second simulation of the plurality of simulations using the output of the first simulation stored in the relational database or utilizing data that is transferred from the analytical relational database that has either been generated by the first simulation or is a new set of parameters that define a new set of criteria that will generate a new simulation. The second configuration of the two specified above and the results of this simulation can be compared after the completion of all simulations in a sequence of data groups with earlier simulations by using analytical techniques such that the success of individual simulations can be compared after the fact in the attached analytical database.

Implementations can include one or more of the following features. The supercomputer can run at speeds over 100 TFLOPS ($10^{12}$ FLOPS (Floating Point Operations Per Second)). The supercomputer can be a Blue Gene series supercomputer. In one aspect, only a single setup of data within the relational database is required for the supercomputer to execute both the first simulation and the second simulation through transactional processing. In another aspect utilizing a connected analytical relational data base as an SOA component of the system, many setups of data can be stored and the results of many simulations can be compared analytically after the series of simulations have been completed.

The details of one or more implementations are set forth in the accompanying drawings and the description below. Other features and advantages will be apparent from the description and drawings, and from the claims.

BRIEF DESCRIPTION OF THE DRAWINGS

FIG. 1 is a block diagram of a conventional supercomputer processing system.

FIG. 2 illustrates a block diagram of a supercomputer processing system including a supercomputer and a transaction hub in accordance with one implementation.

Like reference symbols in the various drawings indicate like elements.

DETAILED DESCRIPTION OF THE INVENTION

Figure 3:
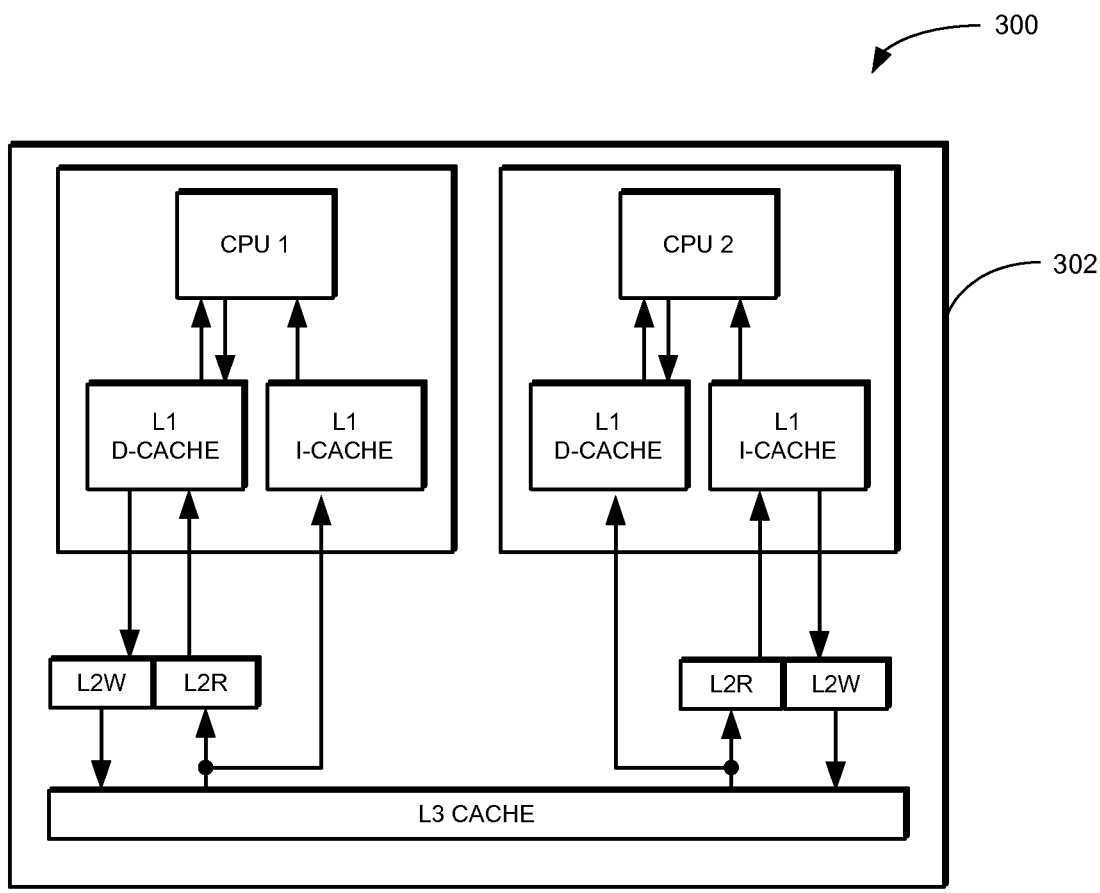
FIG. 3 illustrates one implementation of the transaction hub of FIG. 2 in accordance with one implementation.

The present invention relates generally to data processing, and more particularly to techniques for executing multiple simulations on a supercomputer. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

FIG. 2 illustrates one implementation of a supercomputer processing system 200 including a supercomputer 202 and a transaction hub 204. In one implementation, the supercomputer 202 is a Blue Gene series supercomputer and the transaction hub is a WebSphere Customer Center product, both of which are available from International Business Machines Corporation of Armonk, N.Y. In one implementation, the transaction hub 204 is a data processing system that includes an event triggering service 206 that can detect an output of a given simulation, and automatically trigger the start of a subsequent simulation that uses (e.g., as an input) the output of a prior simulation or data from an attached analytical relational database. In one implementation, the analytical relational database (that is accessed by the transaction hub 204) can store the results of a first simulation and input new data for a new simulation from which the results can be compared with the results of the first simulation. Unlike a conventional supercomputer processing system that can only execute simulations through batch processing—e.g., execute one simulation at a time in batch mode—the supercomputer processing system 200 is operable to perform multiple simulations through (automated) transaction processing. In one implementation, the transaction hub 206 is designed with a service-oriented architecture (SOA) having a services layer as primary interfaces. The services layer can be used to integrate the supercomputer 202 with multiple other computer systems and databases.

In one implementation, the supercomputer 202 has a parallel architecture that comprises a cluster of nodes (e.g., compute nodes or input/output nodes), which enables the supercomputer 202 to run at speeds over 100 TFLOPS. FIG. 3 illustrates one example of a node 300 (e.g., a compute node or an input/output node) within the supercomputer 202. In one implementation, each compute or input/output node is a single application-specific integrated circuit (ASIC) 302 with associated dynamic random access memory (DRAM) memory chips. The memory associated with the ASIC 302 generally, however, has a limited size and, therefore, is not large enough to store results of simulations. As shown in FIG. 3, in one implementation, the ASIC 302 integrates two (700 MHz PowerPC 440) embedded processors (CPU 1, CPU 2), each with a double-pipeline-double-precision Floating Point Unit (FPU), a cache sub-system (L1, L2, L3 data/instruction caches) with built-in DRAM controller (not shown) and logic to support multiple communication sub-systems. In one implementation, the supercomputer 202 (FIG. 2) is comprised of a plurality of cabinets, in which each cabinet holds 1024 compute nodes. For example, the Blue Gene/L supercomputer includes a configuration of 65,536 compute nodes (i.e., $2^{16}$ nodes) and an additional 1024 input/output nodes in 64 air-cooled cabinets. The ASIC 302 can include a different number of embedded processors, and have a different hierarchy of caches.

Figure 4:
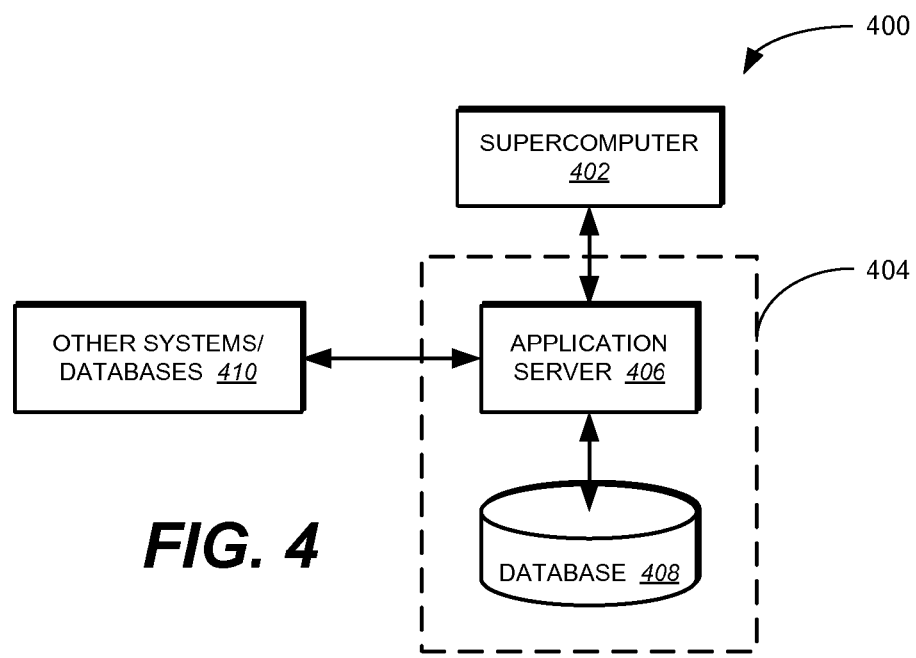
FIG. 4 illustrates one implementation of a node in the supercomputer of FIG. 2 in accordance with one implementation.

FIG. 4 illustrates one implementation of a supercomputer processing system 400 including a supercomputer 402 and a transaction hub 404. In one implementation, the transaction hub 404 includes an application server 406 and a database 408. In one implementation, the application server 406 contains a scalable application infrastructure (e.g., a service-oriented architecture (SOA)) that permits the application server 406 to serve as a transactional processing platform through which the supercomputer 402 can be connected to the database 408, in addition to other systems and/or databases 410. The application server 406 can be a WAS or BEA WebLogic server, and the database 408 can comprise a relational database engine (e.g., DB2). In one implementation, the application server 406 runs an AIX (IBM UNIX) or a z/OS operating system, and includes AIX ports to RedHat Linux and SUSI Linux. In one implementation, the AIX ports are standard ports, via sockets or TCP/IP, for the proper transfer mechanism used between Unix based systems.

In general, the supercomputer processing systems 200, 400 represent a complete software/hardware package that enables users to model behaviors (in an automated manner) that require multiple simulations from multiple data sets. Example behaviors that can be modeled in a more efficient manner through use of the supercomputer processing systems 200, 400 (relative to conventional supercomputer processing systems) include modeling of: pandemics on a worldwide basis, in-silico chemical trials on 100,000+ patients (e.g., in-silico trials have been completed in one test of the system on over 27 million patients), bioterrorism networks on a worldwide basis, warranty analysis simulations that allow for the identification of potential weak points in production vehicles before recall by government, global weather simulations, and oil secondary recovery simulations, reservoir simulations, and well field management.

Figure 5:
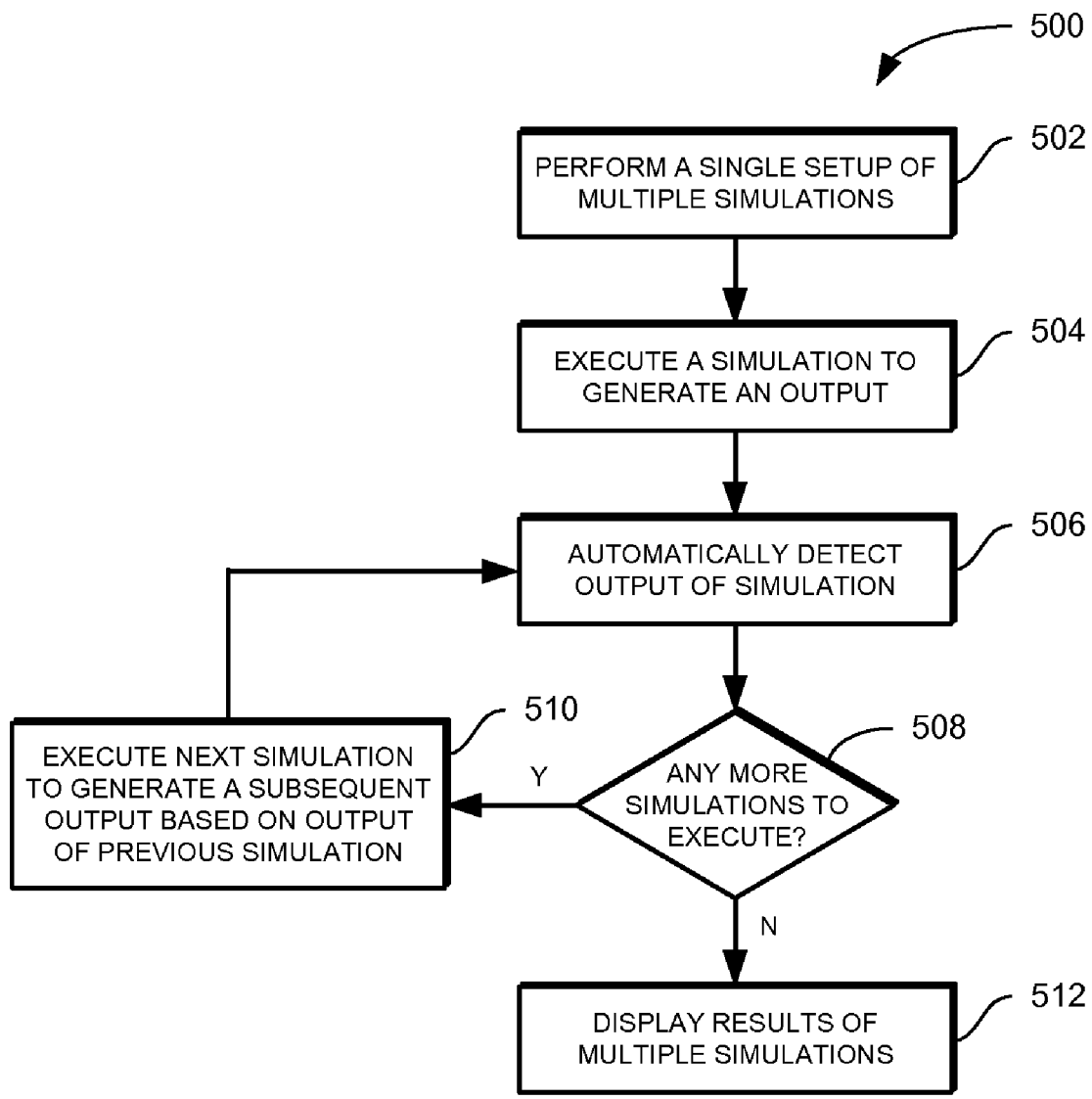
FIG. 5 illustrates a method for executing multiple simulations on a supercomputer in accordance with one implementation.

FIG. 5 illustrates a method 500 for executing multiple simulations on a supercomputer in accordance with one implementation. A single setup (or first setup) of multiple simulations is performed (e.g., by a user) (step 502). In one implementation, a single setup refers to a user having to only stage data only for a first simulation of the multiple simulations—and the rest of the multiple simulations are automatically performed through transactional processing and the incorporation of the results of the first simulation as a basis for the second simulation can be completed that allows for a different component in the holistic problem to be acted upon with slightly different parameters.

Another setup can consist of data sets that are accessed in an attached analytical relational database that allows for a total change in parameters from the first simulation. An example of the first set up would be that the result of a simulation of microbiological degradation of oil in a reservoir under certain pressure, temperature, and partial pressure of oxygen would be fed to a simulation that utilizes this input to simulate the reaction throughout the reservoir to the new physical conditions with respect to the biological community. This simulation result would then be utilized to see how these new conditions would affect another component in the reservoir such as Fe (various iron species) and the reaction of various Fe species could be understood under the new pressure, temperature, and partial pressure of oxygen conditions that were generated as a result of the initial simulation.

An example of the use of multiple simulations of separate data sets stored in a relational analytical database attached to the transactional data base would be the input of another set of microbiological population data sets to ascertain what the differences are between the first simulation parameters in the change in the pressure, temperature, and partial pressure of oxygen data (physical property data) and different input values for the microbiological species diversity such that not only the physical condition changes in the reservoir could be tested to see how they effected this new diversity of microbiological species but also how the new biological species diversity would effect the physical parameters of the reservoir. This then would allow for the offline analysis of results such that new self-building simulations could be completed utilizing the best parameters or series of parameters from earlier simulations. One could think of this approach as a means of developing the best set of parameters to feed the first simulation discussed that builds upon itself. Both simulation configurations promote continuous simulations but to solve slightly different problems.

A (first) simulation of the multiple simulations is executed (e.g., through supercomputer 202) to generate an output (step 504). The output of the simulation is automatically detected (e.g., by event triggering service 206) (step 506). A determination is made (e.g., by event triggering service 206) whether there are additional simulations to execute (step 508). If there is an additional simulation to execute, responsive to the detection of the output (in step 506), a next simulation is executed to generate a subsequent output based on an output of previous simulation (step 510). In general, the execution of the subsequent simulation does not have to be based on (or include) data generated from the output of a previous simulation. In such a circumstance, the benefit realized by the through operation of the method 500 is the automatic execution of the subsequent simulation without having to require user input to initiate execution of the subsequent simulation. The method 500 then returns back to step 506. If in step 508 there are no additional simulations to execute, the results of the multiple simulations are displayed to the user (e.g., through a display in communication with the transaction hub 204 or other system in communication with the transaction hub 204).

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 6:
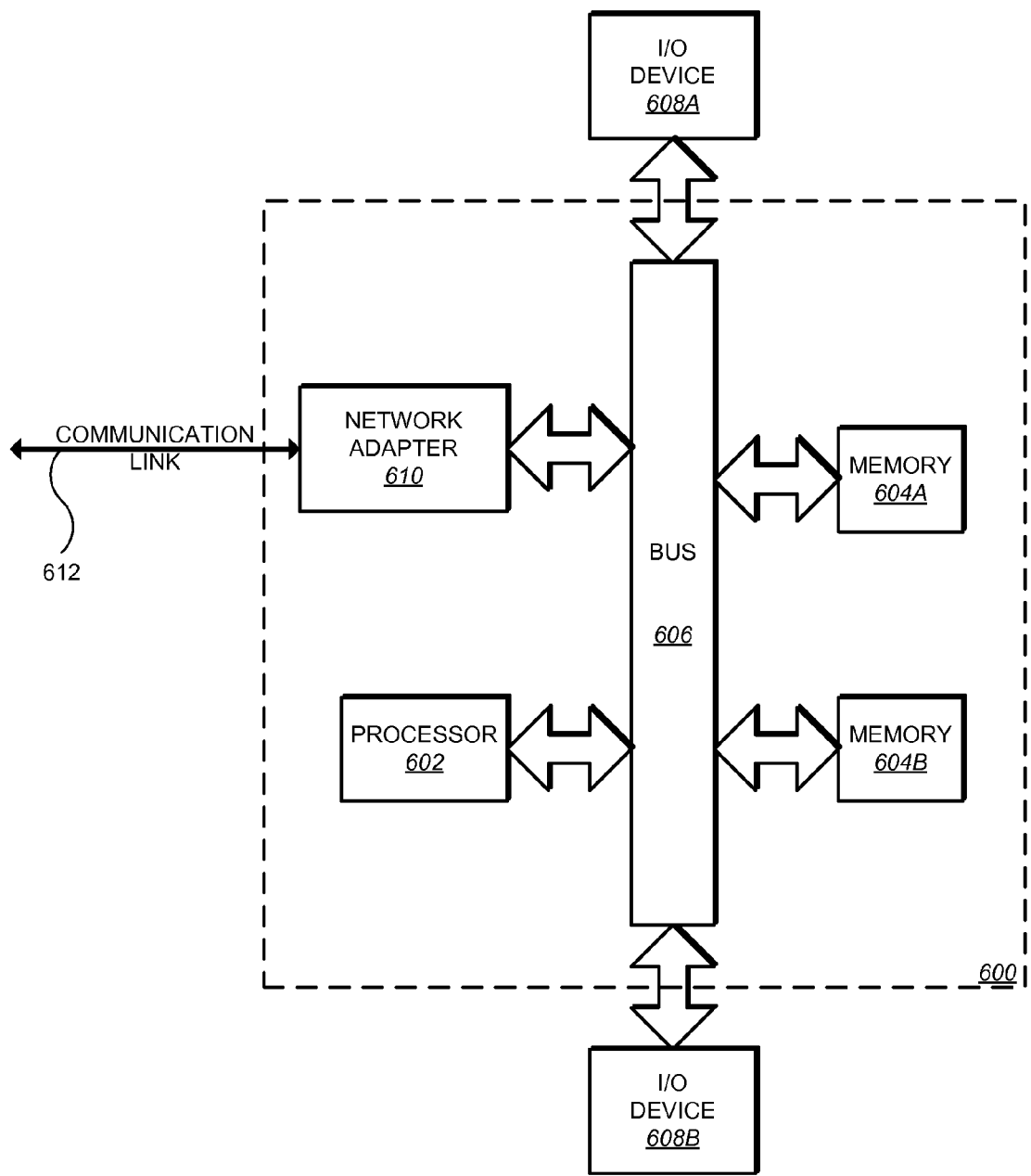
FIG. 6 is a block diagram of the transaction hub in FIG. 2 in accordance with one implementation.

FIG. 6 illustrates a data processing system 600 suitable for storing and/or executing program code. Data processing system 600 includes a processor 602 coupled to memory elements 604A-B through a system bus 606. In other implementations, data processing system 600 may include more than one processor and each processor may be coupled directly or indirectly to one or more memory elements through a system bus. Memory elements 604A-B can include local memory employed during actual execution of the program code, bulk storage, and cache memories that provide temporary storage of at least some program code in order to reduce the number of times the code must be retrieved from bulk storage during execution. As shown, input/output or I/O devices 608A-B (including, but not limited to, keyboards, displays, pointing devices, etc.) are coupled to data processing system 600. I/O devices 608A-B may be coupled to data processing system 600 directly or indirectly through intervening I/O controllers (not shown).

In one implementation, a network adapter 610 is coupled to data processing system 600 to enable data processing system 600 to become coupled to other data processing systems or remote printers or storage devices through communication link 612. Communication link 612 can be a private or public network. Modems, cable modems, and Ethernet cards are just a few of the currently available types of network adapters.

Various implementations for executing multiple simulations through a supercomputer processing system have been described. Nevertheless, various modifications may be made to the implementations. For example, though the techniques described above refer to supercomputer having a parallel processing architecture, the techniques are applicable to other computer systems that do not have the capability of housing its own data repository. In addition, steps of the methods described above can be performed in a different order and still achieve desirable results. Accordingly, many modifications may be made without departing from the scope of the following claims.

What is claimed is:

1. A supercomputer processing system configured to execute a plurality of simulations through transaction processing, the supercomputer processing system comprising:
    a supercomputer configured to execute a first simulation of the plurality of simulations and generate an output based upon execution of the first simulation, the supercomputer including a plurality of nodes in which each node comprises an application-specific integrated circuit (ASIC) having dual embedded processors, each with a double-pipeline-double-precision Floating Point Unit (FPU) and cache sub-system (L1, L2, L3) with built-in DRAM controller, the dynamic random access memory (DRAM) of each application-specific integrated circuit (ASIC) having a size not large enough to store the output of the first simulation; and
    a transaction hub including
        a relational database configured to store the output of the first simulation;
        an application server having a service-oriented architecture (SOA) that supports an event triggering service, the event triggering service configured to detect the output of the first simulation and automatically trigger the supercomputer to execute a second simulation of the plurality of simulations using the output of the first simulation stored in the relational database, wherein one setup of data for only the first simulation is needed to provide the output and a subsequent output for a subsequent simulation, wherein the application server is coupled between the supercomputer and the relational database, wherein the application server is configured as a transactional processing platform to automatically perform transactional processing between the supercomputer and the relational database, wherein the second simulation is executed through the transactional processing of the application server coupled between the supercomputer and the relational database using the output of the first simulation stored in the relational database; and
        an analytical relational database configured to store the output of the first simulation and to compare the output of the first simulation with the subsequent simulation, wherein the subsequent simulation uses additional data other than the stored output of the first simulation.

2. The supercomputer processing system of claim 1, wherein the supercomputer runs at speeds over 100 TFLOPS ($10^{12}$ FLOPS (Floating Point Operations Per Second)).

3. The supercomputer processing system of claim 2, wherein the supercomputer comprises a plurality of cabinets that holds 1024 or more compute nodes.

4. The supercomputer processing system of claim 2, wherein only a single setup of data within the relational database or a networked attached analytical relational database is required for the supercomputer to execute both the first simulation and the second simulation through transactional processing.

* * * * *